No. 750,204. PATENTED JAN. 19, 1904.
R. A. LACHMANN.
GAGE.
APPLICATION FILED FEB. 25, 1903.
NO MODEL. 4 SHEETS—SHEET 1.

FIG. 3.A

Witnesses
Harry L. Ames
Herbert D. Lawson

Inventor
Robert A. Lachmann
By Victor J. Evans
Attorney

No. 750,204. PATENTED JAN. 19, 1904.
R. A. LACHMANN.
GAGE.
APPLICATION FILED FEB. 25, 1903.
NO MODEL. 4 SHEETS—SHEET 2.
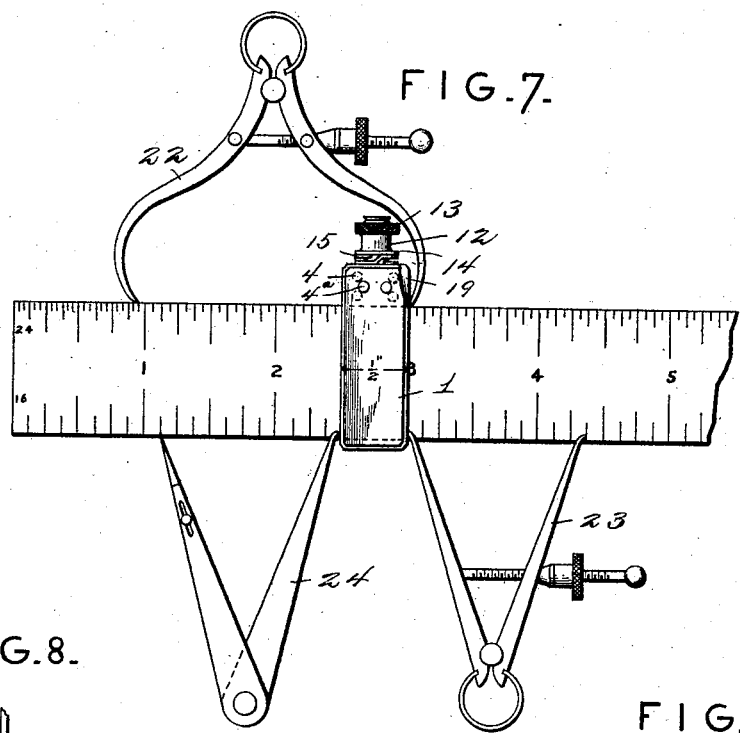
FIG. 7.
FIG. 8.
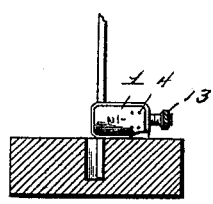
FIG. 10.
FIG. 9.
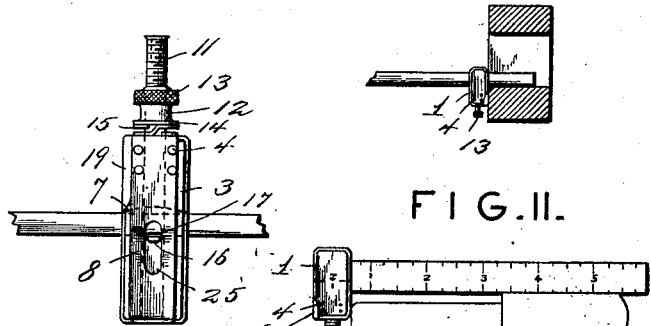
FIG. 11.
FIG. 12.
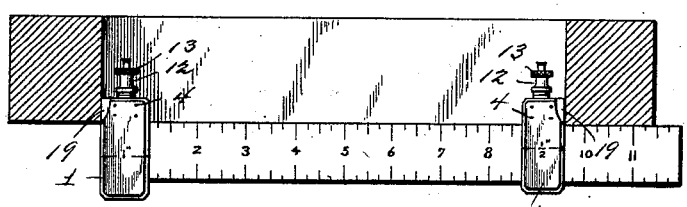
Witnesses
Harry L. Ames.
Herbert D. Lawson
Inventor
Robert A. Lachmann,
By Victor J. Evans
Attorney.

No. 750,204. PATENTED JAN. 19, 1904.
R. A. LACHMANN.
GAGE.
APPLICATION FILED FEB. 25, 1903.
NO MODEL. 4 SHEETS—SHEET 3.
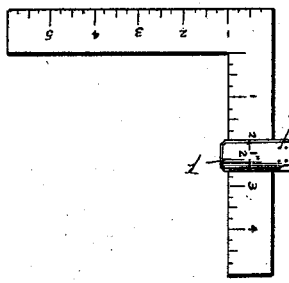
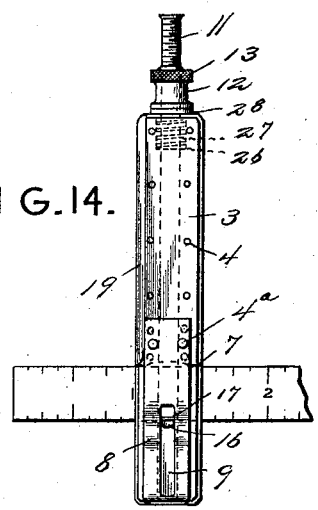
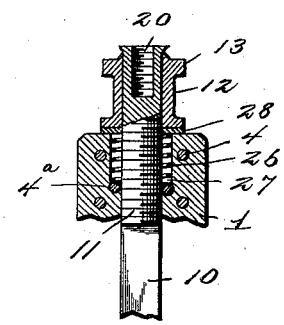
Inventor
Robert A. Lachmann.
By Victor J. Evans
Attorney
Witnesses
Harry L. Ames.
Hubert Lawson

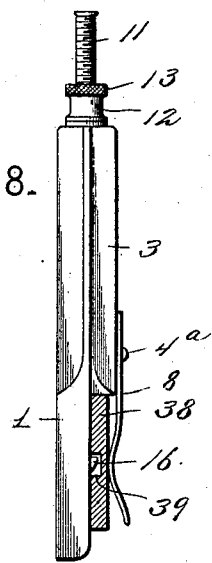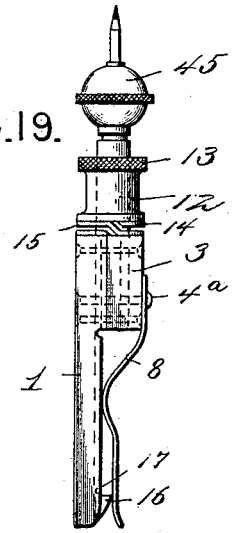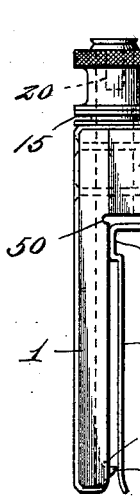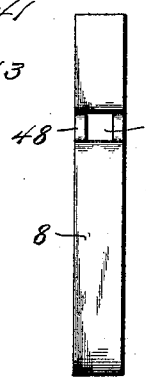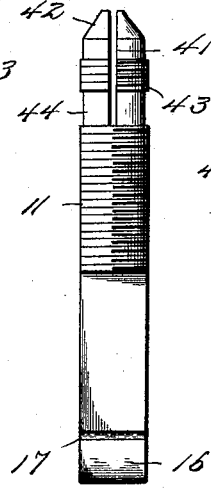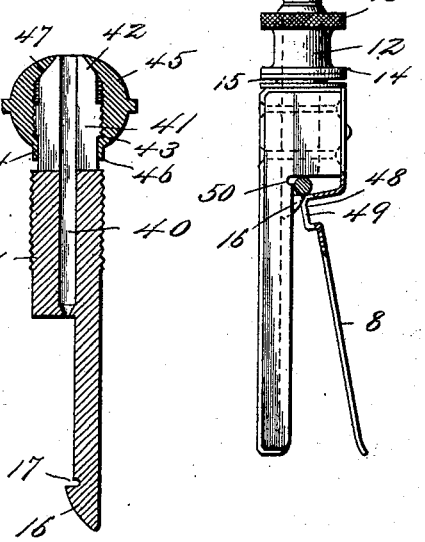

No. 750,204. Patented January 19, 1904.

UNITED STATES PATENT OFFICE.

ROBERT A. LACHMANN, OF CHICAGO, ILLINOIS.

GAGE.

SPECIFICATION forming part of Letters Patent No. 750,204, dated January 19, 1904.

Application filed February 25, 1903. Serial No. 145,059. (No model.)

*To all whom it may concern:*

Be it known that I, ROBERT A. LACHMANN, a citizen of the United States, residing at Chicago, in the county of Cook and State of Illinois, have invented new and useful Improvements in Gages, of which the following is a specification.

My invention relates to new and useful improvements in gages; and its object is to provide a device of this character principally adapted to be applied to a scale-measure of any description to permit of and facilitate the accurate adjustment of calipers to correspond to any graduation upon the scale-measure.

A further object is to provide a gage which is of simple construction and which is provided with means whereby the same may be readily attached to and held upon a scale-measure and at the same time permit it to be adjusted in relation to the gage.

A further object is to provide means for locking the gage upon the scale-measure after it has been moved to adjusted position.

With the above and other objects in view the invention consists in the novel construction and combination of parts hereinafter more fully described and claimed, and illustrated in the accompanying drawings, showing the preferred form of my invention, and in which—

Figure 1:
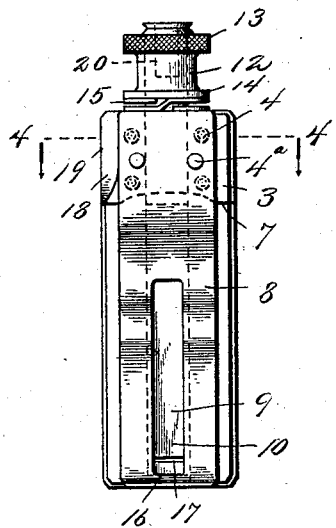
Figure 2:
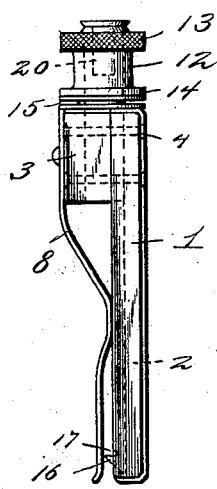
Figure 5:
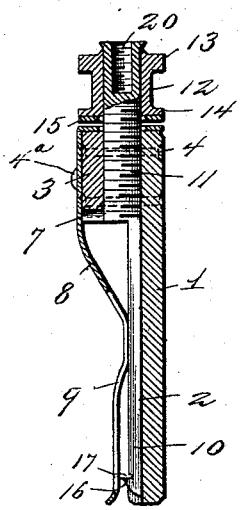
Figure 3:
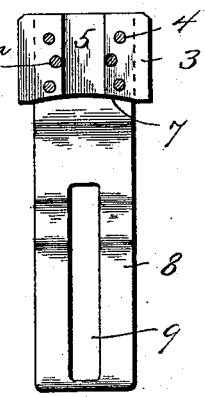
Figure 6:
Figure 6:
Figure 4:
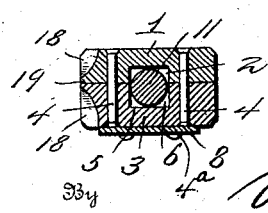

Figure 1 is a front elevation of my improved gage. Fig. 2 is a side elevation thereof. Figs. 3 and 3ᵃ are inner elevations of the two sections of the body of the gage. Fig. 4 is a section on line 4 4 of Fig. 1. Fig. 5 is a central longitudinal section. Fig. 6 is a detail view of the slide detached. Fig. 7 is a view showing the gage in position upon a scale-measure and showing the manner in which calipers of different form may be set to correspond with any desired graduation upon the measure. Fig. 8 is a view showing the gage in position upon a measure and in use to determine the depth of a recess. Fig. 9 is a similar view of the gage upon a straight-edge and used for squaring a die. Fig. 10 is a front elevation of the gage, showing a narrow straight-edge in position therein. Fig. 11 is a view showing the gage mounted upon a scale-measure and employed as a hook-rule. Fig. 12 shows two gages of my improved construction arranged upon a scale-measure in such a manner as to form inside calipers. Fig. 13 shows the gage in position upon a try-square for marking off objects by the use of a scriber. Fig. 14 shows a modified form of gage which is adapted when mounted upon a scale-measure to form one arm of a square. Fig. 15 is a section through the head of the gage and showing a modified arrangement of tension-spring. Fig. 16 is a detail view of one form of attachment which may be used in connection with my improved gage. Figs. 17, 17ᵃ, and 17ᵇ are detail views of modified forms of attachments which may be used with the gage. Fig. 18 is a side elevation of the modification illustrated in Fig. 14 and showing the toe of the slide in position within the groove of a grooved rule. Fig. 19 is a side elevation of the gage, showing a modified form of needle-holding device connected to the slide thereof. Fig. 20 is a detail view of the slide and holding mechanism detached, the circular nut of the holder being removed. Fig. 21 is a longitudinal section through said modified form of slide and showing the binding-nut in position thereon. Fig. 22 is a side elevation of another modified form of gage especially adapted for use in holding wire or needles therein. Fig. 23 is a similar view of said modification, showing a needle clamped in position within the gage; and Fig. 24 is a detail view of the spring employed in connection with the modification illustrated in Figs. 22 and 23.

Referring to the figures by numerals of reference, 1 is a plate having a groove 2 extending longitudinally within the upper face thereof, said groove being angular in cross-section. A block 3 is adapted to be secured upon the grooved face of plate 1, at one end thereof, the same being held in position thereon by means of bolts or rivets 4, and this block has an angular groove 5 in its inner face, which is adapted to register with groove 2 and form a rectangular passage 6. (Shown in Fig. 4.) The inner edge of block 3 is concave, as shown at 7, and the ends of said concave face are in a plane at right angles with the side edges of the plate 1. Rivets or bolts 4ᵃ are used to secure to the front face of the block the end of a spring-strip 8, which is bent downward, so as to contact with the grooved face of plate 1 at a point intermediate the block 3 and the opposite end of the plate, and this spring is preferably provided with a longitudinally-extending slot 9.

A slide 10, angular in cross-section, is mounted within the groove 2 and is provided at one end with a threaded cylindrical portion 11, which is slidably mounted within the rectangular passage 6 and has a nut 12 thereon. A knurled flange 13 incloses the upper end of this nut, and a second flange 14 is arranged upon the lower edge thereof and is adapted to normally bear upon a spring-washer 15, which is interposed between it and the adjacent ends of the block 3 and plate 1. The opposite end of slide 10 has a toe 16, which extends from the outer face thereof at right angles therewith, the width of said toe being slightly less than the width of the slide. This toe is adapted to slide under the spring-strip 8, and a groove 17 is preferably formed transversely within the slide 10 and in alinement with the inner face of the toe 16, so as to prevent the accumulation of dust upon said toe at the inner end thereof. The head of the gage—i. e., that portion formed by the block 3 and the adjacent portion of plate 1—is concaved at opposite sides of one edge, as shown at 18, to form a clearance for an edge 19, and this edge is in alinement with the adjacent side of plate 1 and is at right angles to the plane within which the ends of the concave face 7 are located. The outer end of the screw-threaded cylindrical portion 11 of slide 10 has a threaded recess 20 therein, which is adapted to receive a threaded stud 21, which may extend from any one of a series of attachments adapted to be used in connection with this gage. In Fig. 17 I have shown some of these attachments.

To place a gage constructed in accordance with my invention upon a graduated scale or measure, the end of said measure is inserted under the spring-strip 8 and over the slide 10 and the plate 1. Said spring will bear upon the measure, as is obvious, and prevent the same from slipping from position prior to its being locked within the gage. Said measure may be adjusted until any desired graduation thereon is brought into alinement with either edge of the gage, and after it assumes this position the nut 12 is turned so as to draw toe 16 against the outer edge of the measure, and said toe will slide the measure upward into contact with the ends of concave face 7 and firmly bind the same thereagainst. After the gage has been locked in position upon the measure at a desired point thereon calipers of different kinds may be set at any desired graduation. In Fig. 7 I have shown outside calipers 22, inside calipers 23, and hermaphrodite calipers 24 adjusted to different graduations, with the use of the gage in locked position upon a scale-measure. The gage can also be adjusted to a suitable point upon the measure to form a hook-rule, as shown in Fig. 11, and by placing two gages of the construction hereinbefore described upon a scale-measure and with the edges 19 thereof at the outer sides said gages can be used as an inside calipers, as has been clearly illustrated in Fig. 12. It will of course be understood that by reversing these gages upon the measure they can be used as an outside calipers. In Fig. 8 I have illustrated a gage in position upon a scale-measure and used as a gage for determining the depth of a recess, and in Fig. 9 the gage is shown in position upon a straight-edge and used for squaring a die. This gage may be put to various other uses, and may, if desired, be mounted upon a try-square, as illustrated in Fig. 13, for marking off distances upon material by the use of a scriber.

In Fig. 10 I have shown a modified form of gage which is substantially the same in construction as that heretofore described. The only difference is that the slot 25, formed within the spring-strip 8, is shorter than that illustrated in Figs. 1, 2, and 3. With this construction the spring is so shaped as to only lie in the path of the toe 16 for a short distance at a point where it contacts with the plate 1, and that portion is slotted, as shown, to permit the toe to have unlimited movement within the groove 2. In this Fig. 10 I have shown the gage fastened upon a narrow straight-edge, and the same is shown clamped in position against the concave face 7 by the toe of the slide.

In Fig. 14 I have shown a modified form of gage, the head thereof being of considerable length, and this gage is adapted when mounted upon a graduated measure to form one arm of a square. This modification, as shown in dotted lines, has a coiled spring 26 arranged with a recess 27 and closing the passage 6 and bearing upon a washer 28, mounted upon the outer end of the head and beneath nut 12. I have shown this modified form of cushion-spring more in detail in Fig. 15.

It will be understood that the gage can be readily attached to a grooved rule 38 by placing the toe 16 within the groove 39, as illustrated in Fig. 18.

As hereinbefore stated, threaded recesses 20 are preferably provided within the cylindrical portion 11 of the slide for the reception of suitable marking devices or holders, such as illustrated in Figs. 16, 17, 17$^a$, and 17$^b$. If desired, however, the cylindrical portion of the slide may be constructed in the manner illustrated in Figs. 20 and 21. By referring to said figures it will be seen that a passage 40 extends therethrough longitudinally, and one end of said cylindrical portion has oppositely-arranged longitudinally-extending slots 41 therein. The outer end 42 is tapered, as shown, and is provided with a series of screw-threads 43, which are separated from the threads thereon, which are engaged by nut 12 by a smooth surface 44. A substantially spherical nut 45 engages these threads 43 and has a flange 46 at the inner end thereof, which bears upon the smooth surface 44 and serves to prevent a removal of the nut from the end of the cylindrical portion of the slide. The flange 46 is pressed inward upon the smooth surface 44 after nut 45 has been screwed inward upon the threads 43. The passage 40 is adapted to receive a lead, needle, or other suitable device, which is clamped therein by screwing the nut 45 inward and causing the inner tapered surface 47 of said nut to bear upon the tapered end 42 and cause the clamping of the object within the passage.

When it is desired to hold a needle, wire, or other similar object of small diameter between the spring of the gage and the body 1, it is necessary to provide a spring such as illustrated in Figs. 22, 23, and 24. This spring has a substantially L-shaped extension 48, which bears upon the body at a point close to head 3, and said extension is slotted, as shown at 49, to permit the toe 16 to pass therethrough into contact with the object, as illustrated in Fig. 23. With this modified form of gage a transversely-arranged groove 50 is preferably arranged within the body 1 in alinement with the inner face of the head 3, so as to prevent the accumulation of dust, dirt, &c.

By employing a needle 34, such as illustrated in Fig. 16, and attaching the device herein described to a combination-square it can be used as a surface-gage, and by placing two gages upon one measure and putting a needle 35 in the recess 20 of one gage and a lead-holder 36 in the recess 20 of the other gage the devices can be used as a compass. If desired, a cup-center 37 can be attached to the screw 11, and, in fact, any suitable attachment can be employed in connection with the gage by merely providing the same with a threaded stem 31 which can be inserted into recess 20. The edges of the gage are preferably beveled, so as to prevent injury to or by any articles which may be contacted thereby. It will be understood that the gage can be employed for many other purposes not herein referred to. The slot in the spring-strip of the gage enables the user to readily see the location of the toe 16.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a grooved plate, and a grooved block secured to one end thereof to form a head; of a slide adjustably mounted within the grooved plate and having a toe projecting from one end of the slide, and a spring-strip secured to the block and adapted to contact with the slide and plate.

2. In a device of the character described, the combination with a plate having a grooved face, and a head at one end of the plate; of a slide adjustably mounted within the grooved plate and having a toe extending from the slide, and a slotted spring-strip secured to the head and adapted to bear upon the plate and slide, said slot being adapted to receive the toe of the slide.

3. In a device of the character described, the combination with a plate having a groove in one face thereof, and a grooved block secured upon the plate at one end thereof; of a slide adjustably mounted within the groove and having a toe extending from the slide, a groove being formed within the slide at the base of the toe, and a slotted spring-strip secured to the block and adapted to bear upon the slide and plate, said slot being adapted to receive the toe of the slide.

4. In a device of the character described, the combination with a grooved plate, and a grooved block secured thereto at one end having a concaved inner face, the ends thereof being in a plane at right angles to the side of the plate and block; of a slide adjustably mounted within the grooves and having a toe extending therefrom and above the inner face of the plate, and a slotted spring secured to the block and adapted to contact with the slide and plate, said slot serving to receive the toe of the slide.

5. In a device of the character described, the combination with a plate having a groove in one face thereof, and a head at one end of the plate having a passage therethrough registering with the groove; of a slide mounted within the groove and having a toe extending therefrom and above the face of the plate, a threaded end to the slide slidably mounted within the passage, means thereon for adjusting the slide within the groove and passage, and a spring secured to the head and adapted to contact with the slide and plate.

6. In a device of the character described, the combination with a plate having a groove in one face thereof, and a head at one end of the plate having passage registering with the groove; of a slide mounted within the groove and having a threaded cylindrical end to the slide slidably mounted within the passage, a slotted spring-strip secured to the head and adapted to bear upon the slide and plate, the slide having a toe extending therefrom and adapted to travel within the slot in the spring-strip, and means upon the cylindrical portion of the slide for adjusting said slide within the groove and passage.

7. In a device of the character described, the combination with a plate having a grooved face, and a block secured to said plate and having a groove adapted to register with the groove in the plate to form a passage, one side of said block and plate being concaved at opposite edges to form a centrally-located straight-edge; of a slide mounted within the groove in the plate and having a toe extending therefrom, said slide also having a threaded cylindrical portion adjustably mounted within the passage, means upon said cylindrical portion for adjusting the slide in the grooves, and a slotted spring-strip secured to the block and adapted to bear upon the plate and slide, said slot being adapted to receive the toe.

8. In a device of the character described, the combination with a plate having a grooved face, and a block secured to one end of said plate and having a groove adapted to register with the groove in the plate, said block and plate having one side concaved at opposite edges to form a straight-edge; of a slide mounted within the groove in the plate and having a toe at one end thereof, a groove being arranged in the slide at the base of the toe, the slide being provided with a threaded cylindrical portion slidably mounted between the block and plate, said cylindrical portion having a threaded recess in the outer end thereof, means upon the cylindrical portion for adjusting the slide within its groove, and a spring-bearing for said means, a slotted spring-strip secured to the block and adapted to bear upon the plate and slide, said slot being adapted to receive the toe of the slide, the block being provided with a concaved inner face.

9. In a device of the character described, the combination with a grooved plate, and a grooved block secured to one end thereof to form a head; of a slide adjustably mounted within the grooved plate and having a toe at one end thereof, the opposite end of said slide having a passage therethrough and being provided with longitudinally-extending slots, a nut mounted upon the slotted portion of the slide, and a spring-strip secured to the block and adapted to contact with the slide and plate.

10. In a device of the character described, the combination with a grooved plate, and a grooved block secured to one end thereof to form a head; of a slide adjustably mounted within the grooved plate and head and having a toe projecting from one end of the slide, the opposite end of said slide being tapered and having a passage therethrough and longitudinally-extending slots, a nut mounted upon the tapered end of the slide and adapted to contract the same, and a spring-strip secured to the block and adapted to contact with the slide and plate.

In testimony whereof I affix my signature in presence of two witnesses.

ROBERT A. LACHMANN.

Witnesses:
CLARENCE E. FISH,
SAMUEL LEVY.